(12) United States Patent
Qu et al.

(10) Patent No.: US 7,144,512 B2
(45) Date of Patent: *Dec. 5, 2006

(54) METHOD OF RECLAIMING BRINE SOLUTIONS USING AN ORGANIC CHELANT

(75) Inventors: Qi Qu, Spring, TX (US); Paul H. Javora, Spring, TX (US); Joel L. Boles, Spring, TX (US); Sandra L. Berry, Tomball, TX (US)

(73) Assignee: BJ Services Company, Houston, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 10/623,044

(22) Filed: Jul. 18, 2003

(65) Prior Publication Data

US 2005/0014654 A1  Jan. 20, 2005

(51) Int. Cl.
    *B01D 15/00* (2006.01)
(52) U.S. Cl. .................. 210/666; 166/244.1; 166/267; 175/66; 210/688; 210/694; 210/722; 210/729; 210/912
(58) Field of Classification Search ............. 166/244.1, 166/267; 175/66; 210/688, 694, 699, 700, 210/712, 721, 722, 727, 729, 749, 912, 666
    See application file for complete search history.

(56) References Cited

U.S. PATENT DOCUMENTS

| 4,303,624 | A | * | 12/1981 | Dotson et al. .............. 423/184 |
|---|---|---|---|---|
| 4,317,882 | A | * | 3/1982 | Horiguchi et al. .......... 435/212 |
| 4,465,598 | A | * | 8/1984 | Darlington et al. ......... 210/721 |
| 4,507,208 | A | * | 3/1985 | Simon et al. .............. 210/721 |
| 4,559,216 | A | * | 12/1985 | Nagai et al. ............... 423/531 |
| 4,908,080 | A | * | 3/1990 | Amano et al. ................ 149/2 |
| 5,177,243 | A | | 1/1993 | Parker |
| 5,191,081 | A | | 3/1993 | Parker |
| 5,191,106 | A | | 3/1993 | Parker |
| 5,211,859 | A | * | 5/1993 | Horton et al. .............. 507/211 |
| 5,250,728 | A | | 10/1993 | Parker et al. |
| 5,284,972 | A | | 2/1994 | Parker et al. |
| 5,302,297 | A | * | 4/1994 | Barthrope ................... 210/728 |
| 5,449,822 | A | | 9/1995 | Parker et al. |
| 5,536,452 | A | | 7/1996 | Black |
| 5,547,583 | A | * | 8/1996 | Alexander ................. 210/666 |
| 5,587,022 | A | | 12/1996 | Black |
| 5,688,981 | A | | 11/1997 | Nonomura |
| 5,728,733 | A | | 3/1998 | Ptchelintsev |
| 5,783,527 | A | * | 7/1998 | Dobson et al. ............. 507/269 |
| 5,801,139 | A | | 9/1998 | Fair et al. |
| 5,821,215 | A | | 10/1998 | Crudden et al. |
| 5,837,644 | A | | 11/1998 | Nakanishi et al. |
| 5,869,441 | A | | 2/1999 | Fair et al. |
| 5,962,717 | A | | 10/1999 | Nonomura et al. |
| 5,989,353 | A | * | 11/1999 | Skee et al. ...................... 134/2 |
| 6,139,973 | A | * | 10/2000 | Kawasaki et al. .......... 428/469 |
| 6,335,398 | B1 | * | 1/2002 | Amiya et al. .............. 525/54.3 |
| 6,758,967 | B1 | * | 7/2004 | Anderson et al. ........ 210/198.2 |

OTHER PUBLICATIONS

The Merck Index, p. 8531, 1989.
Hampshire, Sep. 2000, Product information: Hampshire N-acyl ED3A anionic chelating surfactants.
Foxenberg, W.E., Society of Petroleum Engineers (SPE), 24784, Oct. 1992, Optimizing the quality of high-density brines for maximum performance and economic value, Budavari, S., ed.
Bridges, K.L., Completion and Workover Fluids, Reclamation and/or disposal of used fluids and environmental considerations, 2000.

* cited by examiner

Primary Examiner—Peter A. Hruskoci
(74) Attorney, Agent, or Firm—Jones & Smith, LLP; John Wilson Jones

(57) ABSTRACT

A method of reclaiming a well completion brine solution by using an organic chelant that is capable of discriminating between (i) iron and non-zinc heavy metals; and (ii) calcium and zinc. The chelant contains a functional group selected from the group —$CO_2H$ or —$PO(OH)R^{20}$ or a salt or ester thereof, —C(O)—, —OE, —SE, —N=$C(R^2)R^3$, EO—N=$C(R^2)R^3$, —$N(R^2)R^3$, and —$N(C(O)R^1)R^2$ group optionally substituted with a —COOH or —PO(OH)R20 or a salt or ester thereof, —SE or —OE group, wherein $R^2$ and $R^3$ are independently selected from E or forms, with nitrogen, phosphorous, oxygen or sulfur, a heterocyclic ring; E is $R^1$ or —H; $R^1$ is a $C_1$–$C_{30}$ alkyl or aralkyl group or a derivative thereof and $R^{20}$ is —OH or $R^1$.

52 Claims, No Drawings

METHOD OF RECLAIMING BRINE SOLUTIONS USING AN ORGANIC CHELANT

FIELD OF THE INVENTION

The present invention relates to the reclamation of oil field completion fluids using an organic chelating agent.

BACKGROUND OF THE INVENTION

High density brines (completion brines) have been widely used in well completion and workover operations in oilfields in the past several decades. The completion brines are salt solutions typically having fluid densities ranging from about 8.4 ppg (pounds per gallon) to about 20 ppg. Depending on the density desired, a completion brine can be a one salt solution (e.g. NaCl, NaBr, $CaCl_2$, $CaBr_2$, $ZnBr_2$ or formate salt in water), a two salt solution (e.g. $CaCl_2/CaBr_2$ or $ZnBr_2/CaBr_2$), or a three salt solution (e.g. $ZnBr_2/CaBr_2/CaCl_2$). The composition of the brines determines the fluid properties such as pH, density, etc. Depending on the economics, a fluid can be used in a well and then purchased back to be cleaned and reused later.

At the conclusion of any completion or workover project, a substantial volume of "contaminated" or unneeded completion/workover fluid typically remains. Such fluids may be contaminated with any or all of the following: water, drilling mud, formation materials, rust, scale, pipe dope, and viscosifiers and bridging agents used for fluid-loss-control pills. Depending on their composition and level of contamination, these fluids may or may not have further practical or economic value. If it is deemed that the fluids have future use potential, they may be reclaimed. Conversely, if they are determined to have no further use, they must be disposed of in an environmentally responsible way.

The benefits derived from the use of solids-free fluids, and especially high-density brines, for completion and workover operations have been extensively documented in the literature. Unfortunately, the costs associated with the initial purchase and subsequent disposal of such brines has been a hindrance to their universal acceptance especially since the "use once and dispose" means of disposal is neither prudent nor economically sound.

Because of the relatively high cost and limited worldwide natural mineral resources available for producing medium- and high-density completion/workover fluids, it is essential that their used fluids be reclaimed. The reconditioned fluids must meet the same specifications as those of "new" or "clean" fluids. With respect to completion/workover fluids, the term "clean" denotes not only the absence of suspended solids but also the absence of undesirable colloidal or soluble species which are capable of undergoing adverse reactions with formation, formation fluids or other completion fluids to produce formation-damaging insoluble substances.

There are many known methods for removing contaminates from a brine solution. One approach is to remove suspended solids by filtration. Simple filtration processes, wherein the brine is filtered through a plate and frame type filter press with the use of a filter aid such as diatomaceous earth and then through a cartridge polishing filter, are effective to remove solid contamination but they have no effect on removing other types of contamination such as colloidal or soluble species. This is the case since colloidally dispersed and soluble contaminants cannot be removed by filtration without first treating the fluid to change the chemical and/or physical properties of the contaminants. The treatments required to salvage the fluid depend on the nature of the contaminants incorporated and their chemical and physical properties.

A common contaminant in completion fluids is created by iron. In most non-zinc containing brines, it is relatively easy to treat for iron though careful attention must be made by the analyst. Zinc containing high-density brines have proven to be the most difficult to treat for iron removal. Most of the zinc based brines have relatively low pH which often leads to high iron contamination during use as completion and/or workover fluids. Iron contamination in such fluids can reach several hundred or even thousand milligrams per liter. Further, iron in zinc brine solutions is more likely to be in a soluble and stable form. Because of the low solubility of oxygen in such solutions, a significant percentage of the iron contaminants exists as ferrous iron. As a result, precipitation of iron hydroxide with the addition of calcium hydroxide, calcium oxide, or other basic material is difficult to achieve because the brine is highly buffered through aqueous zinc hydroxide complexes, which makes it nearly impossible to raise the pH appreciably. Additionally the pH of these zinc-containing fluids cannot be adjusted above about 6.0. Nonetheless, adding lime or other basic (suspended) material to adjust brine pH can be an important step in the reclamation process which often consists of multiple steps, including filtration, pH adjustments, oxidation, etc.

One brine reclamation process of the prior art consists of the oxidation of polymeric species to reduce the viscosity and yield point of the contaminated brine, oxidation of $Fe^{++}$ to $Fe^{+++}$ to facilitate removal of iron, and the oxidation of organic species which interfere with the reclamation process.

Another brine reclamation process of the prior art consists of the initial filtration of the brine followed by a reduction in the pH of the brine fluid. Carbon or bentonite absorbent is then added to the brine and the solution is allowed to stand for about six hours. The resulting solids are then filtered and the pH of the resulting system is slowly raised. The fluid is then re-filtered and tested for compatibility. Yet another multi-step reclamation process is disclosed in U.S. Patent Pub. No. 2002/0130090. In this process, the spent brine is mixed with acid in order to lower the pH. The fluid is then contacted with a halogen, such as bromine, to increase the density. A reducing agent, such as anhydrous ammonia, is then added. An alkali is then used to neutralize any excess acid. Finally any suspended solid impurities are removed.

Such multi-step processes for reclaiming brine solutions are flawed. First, such processes often take very long to complete which, in turn, increases expenses as more man-hours and more hours of equipment usage are required to complete the reclamation. They are also expensive because they require the addition of multiple chemical agents. In many cases, pH adjustments lead to a reduction in the brine density and a reduction in the resale value of the brine. Further, QA/QC is difficult to control in light of the multi-steps involved.

Therefore there exists a need for an improved method of reclaiming spent brine fluid. There is a need for a process that works independent of property changes to the system, such as pH and temperature. In addition, an improved process is needed which is easier to control in QA/QC.

SUMMARY OF THE INVENTION

The present invention relates to a method of reclaiming a well completion brine solution by use of an organic chelant.

The organic chelant is capable of discriminating between (i) iron and non-zinc heavy metals; and (ii) calcium and zinc. The addition of the chelant causes formation of complex precipitates of the contaminants, which are then removed.

The organic chelant contains a functional group selected from the group of —$CO_2H$ or —$PO(OH)R^{20}$ or a salt or ester thereof, —C(O)—, —OE, —SE, —N═C($R^2$)$R^3$, EO—N═C($R^2$)$R^3$, —N($R^2$)$R^3$, and —N(C(O)$R^1$)$R^2$ group, optionally substituted with a —COOH or —$PO(OH)R^{20}$ or a salt or ester thereof, —SE or —OE group, wherein $R^2$ and $R^3$ are independently selected from E or forms, with nitrogen, oxygen, phosphorus or sulfur, a heterocyclic ring; E is $R^1$ or —H; $R^1$ is a $C_1$–$C_{30}$ alkyl or aralkyl group or a derivative thereof and $R^{20}$ is —OH or $R^1$.

Another embodiment of the invention involves the use of an oxidizer in conjunction with the organic chelant. This additional step may typically be used when the unwanted impurities are in a more soluble valence state, such as Fe (II). The oxidizer serves to transform the impurities into a lower solubility valence state. Oxidizers also serve to remove organic species. The organic chelant thereby becomes more effective in precipitating out the unwanted impurities.

DETAILED DESCRIPTION OF THE INVENTION

The organic chelant for use in the invention is capable of discriminating between (i) iron and non-zinc heavy metals; and (ii) calcium and zinc. Such chelating agents typically have multiple anionic or nonionic functional groups. The anionic or nonionic functional groups interact with the higher valence states associated with transition metals. The discrimination occurs in light of the differences in the equilibrium constant between the chelant and iron and non-zinc heavy metals and the equilibrium constant between the chelant and calcium and zinc. A representation of the reactions is as follows:

  (i)

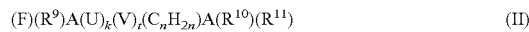  (ii)

Where $K_{eq1}$ is greater than $K_{eq2}$, the reaction proceeds with greater efficiency; thereby resulting in an increase in the number of chelant-Fe complexes.

The chelating agent for use in the invention generally contains about four to about 120 carbon atoms, most preferably from about 10 to about 80 carbon atoms, and preferably contains a functional group selected from the group of —$CO_2H$ or —$PO(OH)R^{20}$ or a salt or ester thereof, —C(O)—, —OE, —SE, —N═C($R^2$)$R^3$, EO—N═C($R^2$)$R^3$, —N($R^2$)$R^3$, and —N(C(O)$R^1$)$R^2$ group optionally substituted with a —COOH or —$PO(OH)R^{20}$ or a salt or ester thereof, —SE or —OE group, wherein $R^2$ and $R^3$ are independently selected from E or forms, with nitrogen, phosphorous, oxygen or sulfur, a heterocyclic ring, preferably having up to about 18 members, most preferably about 5 to 6 members; E is $R^1$ or —H; $R^1$ is a $C_1$–$C_{30}$ alkyl or aralkyl group or a derivative thereof and $R^{20}$ is —OH or $R^1$. The term "salt or ester thereof" as used herein preferably refers to the salt of an acid containing a cation such as a Group 1, 2, 3, 4, 5, 6, or 7 metal, $NH_4^+$ or a quaternary ammonium group and the organic ester of an acid, preferably wherein the ester is a $C_1$–$C_{30}$ linear or branched alkyl, more preferably a $C_{10}$–$C_{14}$, group.

The chelant can further be optionally substituted with at least one group selected from —$CO_2H$ or —$PO(OH)R^{20}$ or a salt or ester thereof, —C(O)—, —OE, —SE, —N═C(R)$^2$$R^3$, EO—N═C($R^2$)$R^3$, —P($R^2$)$R^3$, —PO($R^2$)$R^3$, —$PO_3$, —$OPO_3$, —$SO_3$, —$OSO_3$, —$NO_2$, —N($R^2$)$R^3$ or —N(C(O)$R^1$)$R^2$. For instance, a chelant containing the functional group —$CO_2H$ or ——$PO(OH)R^{20}$ may further contain a —N(C(O)$R^1$)$R^2$ functional group; or R and $R^3$, when forming a heterocyclic ring, may further be substituted with an —OE or —SE group.

The most preferred functional group is —$CO_2H$ or a salt or ester thereof. In a preferred mode, such chelants may further be substituted with a group selected from —OE, —SE, —P($R^2$)$R^3$, —POR$^2$$R^3$, —$PO_3$, —$OPO_3$, —$SO_3$, —$OSO_3$, —$NO_2$, —N═C($R^2$)$R^3$, EO—N═C($R^2$)$R^3$, —N($R^2$)$R^3$, $R^1$ and —N(C(O)$R^1$)$R^2$ optionally substituted with a —COOH or —$PO(OH)R^{20}$ group or a salt or ester thereof. One example of this type of chelant is benzoic acid and its derivatives. Another preferred chelant containing a —$CO_2H$ group is an ethylene diamine type of the structural formula:

$$(R^5CO)(R^4)AR^6A(R^8)(R^9) \quad \quad \text{(I); or}$$

$$(F)(R^9)A(U)_k(V)_t(C_nH_{2n})A(R^{10})(R^{11}) \quad \quad \text{(II)}$$

or a derivative thereof wherein A is nitrogen or phosphorus; $R^4$, $R^8$, $R^9$, $R^{10}$ and $R^{11}$ are independently —(CH$_2$)$_x$COOH or —(CH$^2$)$_x$PO(OH)$R^{20}$ or a salt or ester thereof, —(CH$_2$)$_x$OH or $R^5C(O)$— or a derivative thereof; $R^5$ is —H or a $C_1$–$C_{30}$ alkyl or aralkyl group or derivative thereof, $R^6$ is $C_nH_{2n}$ or a derivative thereof; $R^{14}$ is $R^5$ or $R^8$; F is —(CH$_2$)$_x$COOH or —(CH$_2$)$_x$PO(OH)$R^{20}$ or a salt or ester thereof, —OE, —SE, —(CH$_2$)$_n$SE or —(CH$_2$)$_x$OE or a derivative thereof; U is —(CH$_2$CONR$^{14}$—)$_z$; V is —(C$_n$H$_{2n}$AR$^{14}$—); n is 1 to 15; x is 1 to 4; and k, z and t are independently 0 to 2. In a preferred embodiment, t is 0 when k is other than 0 and k is 0 when t is other than 0.

Particularly preferred as chelants containing a —$CO_2H$ functional group are benzoic acid; nitrilotriacetic acid; ethylene diamine tetra acetic acid (EDTA); hydroxyethylenediamine triacetic (HEDTA); O,O'-bis(2-aminoethyl)ethyleneglycol-N,N,N',N'-tetraacetic acid (EGTA); N-(glycylglycyl)-1,2-diaminoethane-N',N',N'',N''-tetraacetic acid; N-(2-hydroxyethyl)ethylenediaminetriacetic acid; N-lauroyl ethylenediaminetriacetic acid (LED3A); N-(2-hydroxyethyl)ethylenediaminetriacetic acid; acyl glutamic acid; N-lauroyl glutamic acid; acyl sarcosonic acid; N-lauroyl sarcosinic acid, (CH$_2$COOH)$_2$PCH$_2$CH$_2$P(CH$_2$-COOH)$_2$; benzene-1,2-dicarboxylic acid; benzene-1,3,5-tricarboxylic acid; nonyl-1,3-dicarboxylic acid; and 1-hydroxy-2-napthoic acid. The preferred chelants of this type are benzoic acid and LED3A. The most preferred chelant is LED3A.

A further example of a chelant containing a —$CO_2H$ group are N-acyl ethylenediaminetriacetic acid and its derivatives and salts. The counter-ion for these salts should be selected from ionic forms of sodium, potassium, cesium, ammonium, monoethanolamine, diethanolamine, triethanolamine, N-propylamine, isopropylamine, 2-amino-2-methyl-1,3-propane diol, 2-amino-2-methyl-1-propanol, 2-amino-2-ethyl-1,3-propane diol, tris(hydroxymethyl)aminomethane, group II metals, or a Group 3–7 transition metal.

The chelant of the invention further may contain at least one functional group selected from —N($R^2$)$R^3$, —N═C ($R^2$)$R^3$, EO—N=C($R^2$)$R^3$ or —N(C(O)$R^1$)$R^2$ wherein $R^2$ and $R^3$ independently may be substituted with a —COOH or —PO(OH)$R^{20}$ or a salt or ester thereof, —SE or —OE group. The chelant can then be further substituted with a —OE, —$PO_3$, —$OPO_3$, —$SO_3$, —$OSO_3$, or —$NO_2$. Alternatively, the $R^2$ and $R^3$ groups may form, along with a —N, —P, —S or —O, a heterocyclic ring. Representative chelants of this type are N,N'-dimethyl-N,N'-dilauroylethylenediamine; 1,2-diaminobenzene; iminobis (methylenephosphonic acid); 8-hydroxy quinoline; 1-aminobenzene-2-sulfonic acid; porphine; ethylenediaminetetraacetic acid; 1,2-dimethylethylenedinitrilotetraacetic acid; DL-1-alkyl-ethylenedinitrilotetraacetic acid N,N'-diamide; 1,2-dimethylethylenedinitrilotetraacetic acid N,N'-diamide; 1,2-phenylenedinitrilotetraacetic acid; N-(cyclohexyl)iminodiacetic acid; acyl glutamic acid; acyl sarcosinic acid; N,N-dimethyl-2-aminophenol; and 4-phenyl-8-mercaptoquinoline. The preferred chelant of this type is 8-hydroxyquinoline.

The chelant for use in the invention may further contain the functional group —OE or —SE. The chelant can further contain —OE, —$PO_3$, —$OPO_3$, —$SO_3$, —$OSO_3$, or —$NO_2$. Representative chelants of this group consist of N-hydroxy-N-nitrosobenzenamine; 1-hydroxybenzene-2-sulfonic acid; and 4-nitro-1,2-dihydroxy benzene. The preferred chelant of this type is 4-nitro-1,2-dihydroxybenzene.

The chelant may further contain a diketone functional group. Such chelants may be represented by the structural formula of

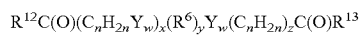

wherein $R^{12}$ and $R^{13}$ are independently —H or a $C_1$–$C_{30}$ alkyl or aralkyl group optionally substituted with a —COOH or —PO(OH)$R^{20}$ or a salt or ester thereof, —N($R^2$)$R^3$, —SE or —OE group; $R^6$ is $C_nH_{2n}$ or a derivative thereof; Y is —O, —S, —P or —N; n is 1 to 30, w is 0 or 1, and x, y and z are independently 0 to 5. The preferred chelant of this type is pentane-2,4-dione or octadecane-2,4-dione.

In yet another embodiment of the invention, the chelant is a dioxime. The dioxime has the structural formula $R^2$C(=N—OE) $(C_nH_{2n}Y_w)_x(R^6)_y Y_w(C_nH_{2n})_zC$(=N—OE)$R^3$; wherein $R^2$ and $R^3$ are independently selected from $R^1$, —($CH_2$)$_s$OE, —($CH_2$)SE, or —($CH_2$)$_s$COOH, —(CH$^2$)$_s$PO(OH)$R^{20}$ or a salt or ester thereof; $R^1$ is —H or a $C_1$–$C_{30}$ alkyl or aralkyl group or derivative thereof; $R^6$ is $C_nH_{2n}$ or a derivative thereof; E is $R^1$ or —H; Y is —O, —S, —P or —N; s is 1 to 4, n is 0 to 5, w is 0 or 1, and x, y and z are independently 0 to 5. The preferred chelant of this type is 2,3-butanedionedioxime.

The organic chelants for use in the invention may exist in powder form. The powder may be introduced directly into the system or a slurry can be made which may then be introduced into the brine. In the field, introducing large amounts of powder, while effective, can create dusting problems. One alternative solution is to form a slurry containing the chelant. Such slurries should be formed from chemically neutral liquids such as water, glycols, and brine, preferably brine. The brine can be taken from the brine that needs to be treated or it can be a clean brine, such as calcium bromide brine with a density of 14.2 ppg. The amount of solvent used should be enough to create a slurry and to reduce dusting.

After the chelant is introduced into the spent brine, the treated brine is mixed for a time sufficient for the chelant to complex the metal. The time that is necessary depends on the amount and type of impurities in the brine. It is also dependent on the amount of chelant used. A typical mixing and resting time is from about 12 hours to about six days. The complexed metal may then be removed using known methods.

The organic chelant is further effective in removing impurities when used by itself. The chelant may be added with other treatment agents typically used in the industry. For example, it may be necessary to add an oxidizer to the system in order to oxidize iron and other transition metal impurities, or to destabilize interfering organic materials. Iron impurities often are present in the ferrous ($Fe^{++}$) state. This state is much more soluble than the ferric ($Fe^{+++}$) state. Therefore, in order to improve the effectiveness of the organic chelant, it may be necessary to add an oxidizer to ensure that the iron is in the ferric state. The oxidizer may be added to the brine with the chelant or may be added to the brine prior to or after the addition of chelant.

Acceptable oxidizers are preferably slow reacting oxidizers, such as calcium and magnesium peroxide, calcium hypochlorite, and other slightly soluble oxidizing agents. Although all oxidizers capable of converting $Fe^{++}$ to $Fe^{+++}$ will work within the system, highly soluble, faster reacting oxidizers, such as hydrogen peroxide and sodium hypochlorite, have a tendency to react with the halides in the brine, which can release the corresponding halogen, especially bromine. Slow reacting oxidizers reduce the release of such halogens, and the amount of vapors passed into the atmosphere.

Other known processes may be used in conjunction with the complexation process discussed herein. For instance, it may be necessary to adjust the pH of the brine. For fluids containing colloidal iron, it is not uncommon to first lower the pH and then raise the pH. For calcium based fluids, raising the pH is typically achieved by having an excess of sodium hydroxide, lime or quick lime suspended in the fluid. Final adjustment to the pH for the reclaimed brine may further be necessary.

Further, the complexation process of the invention may be used in conjunction with the addition of an absorbing or adsorbing material to augment the reclamation, such as activated carbon or clay.

Further, the process of the invention may further include a step of introducing an absorbing or defoaming material to the brine in order to augment the reclamation. Such absorbents and defoamers function to reduce the level of foaming caused by uncomplexed organic chelant. Suitable for use as the absorbent are activated carbon, carbon black and clay, while suitable defoamers are the conventional defoaming agents including glycols, alcohols including long chain alcohols, silicones, and phosphates like tributylphosphate. The amount of absorbent or defoamer material added to the brine is sufficient to override the foaming nature of the organic chelant. Certain of the organic chelants of the invention, such as N-lauroyl ethylenediaminetriacetic acid (LED3A), are more likely to heavily foam than others. When needed, the amount of absorbent or defoamer added to the brine is between from about 8 oz. to about 5 lbs. per barrel of brine and may be added to the brine without removal of the complexed organic chelant. Typically, the absorbent or defoamer is added to the brine prior to filtration of the complexed organic chelant.

Another known addition may be that of reducing agents, such as sulfites, to reduce the oxidation state of iron and other metals to destabilize colloids. This is especially helpful for troublesome brines or to remove color due to organic species. For example, zinc has been used to reduce iron to iron metal for removal by filtration, and magnesium has been used to remove trace zinc and iron from brine. The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims, which follow. The following abbreviations are used in the Examples that follow:

LED3A is N-lauroyl ethylenediaminetriacetic acid.

DE is diatomaceous earth.

EXAMPLE 1

2.03 grams of LED3A slurry, which is 20.9% LED3A in 14.2 ppg $CaBr_2$, were added to 350 ml of 17.4 ppg brine. The initial iron content of the brine was 150 mg/L (72 ppm). The brine was stirred for 8 hours after which the stirrer was turned off. After a further 47 hours a sample was taken and filtered. The iron content was then found to be 35 mg/L (17 ppm).

EXAMPLE 2

0.082 grams of LED3A (0.4 ppb) were added to 70 ml of 16.9 ppg brine. The initial iron content was 512 mg/L (253 ppm). The brine solution was mixed for 15 hours. After which a sample was taken and filtered. The iron content was subsequently measured at 42 mg/L (21 ppm).

EXAMPLE 3

12 grams of sodium hydroxide were added to 350 ml of 18.6 ppg brine. The solution was stirred for 2 days. To 35 ml of the sodium hydroxide treated brine, 0.20 grams of sodium benzoate were added and the brine was magnetically stirred. After an additional 2.5 days, 0.42 grams of sodium benzoate were added to the mixture. The mixture was stirred for an additional 2 days at which point the brine was filtered through fine DE. The initial iron content of 1802 mg/L (808 ppm) was reduced to 16 mg/L (7 ppm).

EXAMPLE 4

1.0 gram of sodium benzoate was added to 70 ml of 18.6 ppg brine. The solution was stirred for 4.7 days. The fluid was then filtered and the iron content measured. The original iron content of the fluid was 753 mg/L (338 ppm) and the iron content after treatment was 63 mg/L (28 ppm).

EXAMPLE 5

0.57 grams of EDTA were added to 100 ml of 15.3 ppg brine. The solution was magnetically stirred for 24 hours. The original iron content was 200 mg/L (109 ppm). A 2 ml sample was then filtered and the resulting iron content was 125 mg/L (68 ppm). No change in the iron content was observed over the next 3 days. Then, 4 ml of 3% hydrogen peroxide were added to the stirred brine in two portions. After 24 hours, a sample was taken and filtered. The resulting iron content was 85 mg/L (46 ppm).

EXAMPLE 6

227 ml of a 15.9 ppg brine solution were magnetically stirred. The initial iron content of this solution was over 1000 mg/L. As the solution was stirred, 17.1 grams of 3% hydrogen peroxide were added. After 4 hours, 0.37 grams of LED3A were added and then the solution was sheared for 30 seconds. 50 ml of the brine were then removed and treated separately. Using the remainder of the original fluid (177 ml), 0.29 grams of additional LED3A were added, the solution was sheared for 30 seconds, and then stirred. After 16 hours, 1 ml of each fluid was filtered and tested for iron. Both solutions had an iron content of 200 mg/L. After about 24 hours, 2.0 grams of 3% hydrogen peroxide were added to the 50 ml solution and 6.5 grams of 3% hydrogen peroxide were added to the original solution. On the fourth day a sample to measure the iron content was taken and filtered for both solutions and the iron content for both solutions was determined to be 30 mg/L (16 ppm).

EXAMPLE 7

This example describes a small-scale plant trial. Using 12 barrels (504 gallons) of 16.0 ppg brine, the solution was divided evenly between two 10 barrel slurry tanks on a Filter Slurry Skid. The initial iron content was 150 mg/L (78 ppm). Each tank was stirred rapidly and the brine was circulated from tank to tank. Slowly, 340 grams of LED3A were added to the brine surface, as the brine was stirred and circulated. Another 200 grams of LED3A were slurried into 300 ml of the 16.0 ppg brine and then added to the stirred brine. The treated brine was cycled from tank to tank for one hour, and then stirred slowly overnight. After 15 hours, a sample was taken, filtered and tested for iron. The iron content was measured at 40 mg/L (21 ppm). The bulk fluid was then filtered through standard 2μ oilfield cartridges.

EXAMPLE 8

This example describes a large-scale plant trial. Using a 15.3 ppg brine, 93 barrels (3906 gallons) were transferred to a 500 barrel mixing tank. The initial iron content was 229 mg/L (125 ppm). The brine was circulated and mixed through the tank's gun-line system. Seven buckets of 23% LED3A in 14.2 ppg $CaBr_2$ solution was prepared in advance. The buckets contained 72.9 lbs of LED3A. Each bucket was opened, stirred and then added to the circulated 15.3 ppg brine. The brine was circulated at a high rate for 1 hour, and thereafter, for 15 minutes every 2 hours. After 8 hours, a sample was taken and filtered. The iron content was determined to be 11 mg/L (6 ppm). The brine was left static for 13 hours, and then circulated for one hour, after which the brine was filtered through DE. Periodic samples of the filtrate were collected during filtration. The iron content for the composite filtrate sample was found to be 26 mg/L (14 ppm).

EXAMPLE 9

Using a 16.3 ppg brine, various concentrations of calcium peroxide and sodium benzoate were added to the brine. The initial iron content of the brine was 1008 ppm. After the calcium peroxide was added, the solution was stirred for 3–4 hours. The sodium benzoate was then added to the solution and stirred for 4–5 hours. The treated brine was then allowed to stand static for 24–48 hours. After which the treated brine was filtered through DE. Results from the testing are shown in Table 1:

TABLE 1

| Colcium Peroxide (ppb) | Sodium Benzoate (ppb) | Resulting Iron Content (ppm) |
|---|---|---|
| 4.37 | 7.0 | 48 |
| 3.5 | 7.0 | 234 |
| 1.0 | 0.0 | 879 |
| 0.0 | 7.0 | 980 |
| 4.36 | 7.0 | 67 |
| 2.0 | 2.0 | 391 |
| 3.0 | 5.0 | 169 |
| 5.0 | 0.0 | 264 |

EXAMPLE 10

To 200 ml of rapidly stirred 16.2 ppg brine containing 200 mg/L iron, add 0.55 grams of 8-hydroxyquinoline. Continue to stir for 72 hours. Filter the treated brine through Medium Grade DE, and test for residual iron. The residual iron content is expected to be less than 95 mg/L (49 ppm).

EXAMPLE 11

To 350 ml of rapidly stirred 15.7 ppg brine containing 150 mg/L iron, add 0.44 grams of 4-nitro-1,2-dihydroxybenzene. Continue stirring for 72 hours. Filter the treated brine through Medium Grade DE, and test for residual iron. The residual iron content is expected to be less than 90 mg/L (48 ppm)

EXAMPLE 12

To 350 ml of rapidly stirred 16.7 ppg brine containing 150 mg/L iron, add 0.20 grams of lime and then 0.30 grams of pentane-2,4-dione. Continue stirring for 72 hours. Filter the treated brine through Medium Grade DE, and test for residual iron. The residual iron content is expected to be less than 95 mg/L (47 ppm).

EXAMPLE 13

To 350 ml of rapidly stirred 16.9 ppg brine containing 200 mg/L iron, add 0.2 grams of lime and then 0.44 grams of 2,3-butanedionedioxime. Continue stirring for 72 hours. Filter the treated brine through Medium Grade DE, and test for residual iron. The residual iron content is expected to be less than 95 mg/L (47 ppm).

EXAMPLE 14

To 100 ml of rapidly stirred 15.3 ppg brine containing 200 mg/L iron, the equivalent of 0.5 grams of the complex compound zinc di-(12-hydroxy-9-octadecenoate) were added. This mixture was stirred for 19.5 hours, and then filtered through coarse DE. The iron content was reduced from its original value of 200 mg/L (109 ppm) to the measured value of 60 mg/L (33 ppm).

From the foregoing, it will be observed that numerous variations and modifications may be effected without departing from the true spirit and scope of the novel concepts of the invention.

The invention claimed is:

1. A method of reclaiming a well completion brine comprising the steps of:
   a. mixing the brine containing metal impurities with an organic chelant for a time sufficient for the chelant to complex a metal and form a complexed metal precipitate; and
   b. removing the complexed metal precipitate from the brine wherein the metal impurities contain iron and further wherein the complexed metal precipitate contains iron.

2. The method of claim 1, wherein the organic chelant contains up to about 120 carbon atoms and further contains at least one functional group selected from the group consisting of $-CO_2H$ or $-PO(OH)R^{20}$ or a salt or ester thereof, $-C(O)-$, $-OE$, $-SE$, $-N=C(R^2)R^3$, $EO-N=C(R^2)R^3$, $-N(R^2)R^3$, and a $-N(C(O)R^1)R^2$ group, optionally substituted with a $-COOH$ or $-PO(OH)R^{20}$ or a salt or ester thereof or $-SE$ or $-OE$ group, wherein $R^2$ and $R^3$ are independently selected from E or forms, with nitrogen, phosphorous, oxygen or sulfur, a heterocyclic ring; E is $R^1$ or $-H$; $R^1$ is a $C_1$–$C_{30}$ alkyl or aralkyl group or a derivative thereof; and $R^{20}$ is either $-OH$ or $R^1$.

3. The method of claim 2, wherein the organic chelant is further substituted with at least one group selected from $-CO_2H$ or $-PO(OH)R^{20}$ or a salt or ester thereof, $-C(O)-$, $-OE$, $-SE$, $-N=C(R^2)R^3$, $EO-N=C(R^2)R^3$, $-P(R^2)R^3$, $-POR^2R^3$, $-PO_3$, $-OPO_3$, $-SO_3$, $-OSO_3$, $-NO_2$, $-N(R^2)R^3$ or $-N(C(O)R^1)R^2$.

4. The method of claim 3, wherein the organic chelant is a dioxime having the structural formula:

$$R^2C(=N-OE)(C_nH_{2n}Y_w)_x(R^6)_yY_w(C_nH_{2n})_zC(=N-OE)R^3$$

or a derivative thereof;
wherein $R^2$ and $R^3$ are independently selected from $R^1$, $-(CH_2)_sOE$, $-(CH_2)_sSE$ or $-(CH_2)_sCOOH$ or $-CH^p)_sPO(OH)R^{20}$ or a salt or ester thereof, $R^1$ is $-H$ or a $C_1$–$C_{30}$ alkyl or aralkyl group or derivative thereof, $R^6$ is $C_nH_{2n}$ or a derivative thereof, E is $R^1$ or $-H$; Y is $-O$, $-S$, $-P$ or $-N$; s is 1 to 4, n is 0 to 5, w is 0 or 1 and x, y and z are independently 0 to 5.

5. The method of claim 2, further comprising mixing the brine with an oxidizer.

6. The method of claim 5, wherein the oxidizer is a slow reacting oxidizer.

7. The method of claim 6, wherein the oxidizer is calcium peroxide or magnesium peroxide.

8. The method of claim 7, wherein the organic chelant is benzoic acid or a salt or ester thereof.

9. The method of claim 2, wherein the functional group is $-COOH$ or a salt or ester thereof.

10. The method of claim 9, wherein the organic chelant is benzoic acid or a salt or ester thereof.

11. The method of claim 9, wherein the organic chelant is further substituted with at least one group selected from $-OE$, $-SE$, $-P(R^2)R^3$, $-POR^2R^3$, $-PO_3$, $-OPO_3$, $-SO_3$, $-OSO_3$, $-NO_2$, $-N=C(R^2)R^3$, $EO-N=C(R^2)R^3$, $-N(R^2)R^3$, $-N(CH_2)_2$ and $-N(C(O)R^1)R^2$ optionally substituted with a $-COOH$ or $-PO(OH)R^{20}$ group or a salt or ester thereof or with an $-OE$ or $\_SE$ group.

12. The method of claim 11, wherein the organic chelant further contains the functional group $-NR^2R^3$ optionally substituted with a $-COOH$ or $-PO(OH)R^{20}$ group or a salt or ester thereof or with an $-OE$ or $-SE$ group.

13. The method of claim 12, wherein the organic chelant is nitrilotriacetic acid or a salt or ester thereof.

14. The method of claim 11, wherein the organic chelant is an ethylene diamine type of the structural formula:

$$(F)(R^9)A(U)_k(V)_t(C_nH_{2n})A(R^{10})(R^{11}) \qquad (I)$$

or a derivative thereof
wherein A is nitrogen or phosphorus; $R^8$, $R^9$, $R^{10}$ and $R^{11}$ are independently —$(CH_2)_xCOOH$ or —$(CH^2)_xPO(OH)R^{20}$ or a salt or ester thereof, —$(CH_2)_xOE$ or $(CH_2)_xSE$ or a derivative thereof; $R^5$ is —H or a $C_1$–$C_{30}$ alkyl or aralkyl group or derivative thereof; $R^{14}$ is $R^5$ or $R^8$; F is —$(CH_2)_xCOOH$ or —$(CH^2)_xPO(OH)R^{20}$ or a salt or ester thereof, —OE, —SE, —$(CH_2)_xSE$ or —$(CH_2)_xOE$ or a derivative thereof; U is —$(CH_2CONR^{14}—)_x$; V is —$(C_nH_{2n}AR^8—)$; n is 1 to 15; x is 1 to 4; and k, z and t are independently 0 to 2.

15. The method of claim 14, wherein the organic chelant is selected from the group consisting of ethylene diamine tetra acetic acid; hydroxyethylenediamine triacetic; O,O'-bis(2-aminoethyl)ethyleneglycol-N,N,N',N'-tetraacetic acid; N-(glycylglycyl)-1,2-diaminoethane-N',N',N'',N''-tetraacetic acid.

16. The method of claim 9, wherein the organic chelant further contains the functional group —$N(COR^1)R^2$ group optionally substituted with a —COOH or —$PO(OH)R^{20}$ group or a salt or ester thereof or with an —OE or SE group.

17. The method of claim 16, wherein the organic chelant contains from ten to one hundred twenty carbon atoms.

18. The method of claim 17, wherein the organic chelant contains a counter ion selected from the group consisting of ionic forms of sodium, potassium, cesium, ammonium, monoethanolamine, diethanolamine, triethanolamine, N-propylamine, isopropylamine, 2-amino-2-methyl-1,3-propane diol, 2-amino-2-methyl-1-propanol, 2-amino-2-ethyl-1,3-propane diol, tris(hydroxymethyl)aminomethane, group II metals, and a Group 3–7 transition metal.

19. The method of claim 9, wherein the organic chelant is substituted with at least one —OE, —SE, —$POR^2R^3$, —$PO_3$, —$OPO_3$, —$SO_3$, or —$OSO_3$ group.

20. The method of claim 19, wherein the organic chelant is substituted with an —OE group.

21. The method of claim 20, wherein the organic chelant is zinc di-(12-hydroxy-9-octadecenoate).

22. The method of claim 9, wherein the organic chelant is substituted with a —$P(R^2)R^3$ or —$POR^2R^3$ group.

23. The method of claim 22, wherein the organic chelant is of the formula $(HOOCCH_2)_2PCH_2CH_2P(CH_2COOH)_2$ or a salt or ester thereof.

24. The method of claim 8, wherein the organic chelant is selected from the group consisting of benzoic acid; benzene-1,2-dicarboxylic acid; benzene-1,3,5-tricarboxylic acid; nonyl-1,3-dicarboxylic acid; and 1-hydroxy-2-napthoic acid and salts thereof.

25. The method of claim 2, wherein the organic chelant contains at least one —$N(R^2)R^3$, —$N=C(R^2)R^3$, EO—$N=C(R^2)R^3$ or a —$N(C(O)R^1)R^2$ group wherein $R^2$ and $R^3$ independently may be substituted with a —COOH, —$PO(OH)R^{20}$, —SE or —OE group or a salt or ester thereof.

26. The method of claim 25, wherein the organic chelant is N,N'-dimethyl-N,N'-dilauroylethylenediamine or a salt thereof.

27. The method of claim 25, wherein the organic chelant is 1,2-diaminobenzene or a salt thereof.

28. The method of claim 25, wherein the organic chelant is iminobis (methylenephosphonic acid) or a salt or ester thereof.

29. The method of claim 25, wherein the organic chelant is further substituted with at least one group selected from —OE, —SE, —$PO_3$, —$OPO_3$, —$SO_3$, —$OSO_3$, or —$NO_2$.

30. The method of claim 29, wherein the organic chelant is substituted with an —OE group.

31. The method of claim 30, wherein the organic chelant is 8-hydroxy quinoline or a salt thereof.

32. The method of claim 30, wherein the organic chelant is substituted with a —$SO_3$ or a —$OSO_3$ group.

33. The method of claim 25, wherein the organic chelant is substituted with a —$SO_3$ or a —$OSO_3$ group.

34. The method of claim 33, wherein the organic chelant is 1-aminobenzene-2-sulfonic acid or a salt thereof.

35. The method of claim 25, wherein the organic chelant is a nitrogen, phosphorous, oxygen or sulfur containing heterocyclic ring.

36. The method of claim 35, wherein the organic chelant is porphine or derivatives thereof or salts thereof.

37. The method of claim 25, wherein the organic chelant is selected from the group consisting of ethylenediamine-tetraacetic acid, 1,2-dimethylethylenedinitrilotetraacetic acid; DL-1-alkylethylenedinitrilotetraacetic acid N,N'-diamide; 1,2-dimethylethylenedinitrilotetraacetic acid N,N'-diamide; 1,2-phenylenedinitrilotetraacetic acid; N,N-dimethyl-2-aminophenol; and 4-phenyl-8-mercaptoquinoline and salts thereof.

38. The method of claim 2, wherein the functional group is —OE or —SE.

39. The method of claim 38, wherein the organic chelant is N-hydroxy-N-nitrosobenzenamine or a salt thereof.

40. The method of claim 38, wherein the organic chelant further contains at least one group selected from —$PO_3$, —$OPO_3$, —$SO_3$, —$OSO_3$, or —$NO_2$.

41. The method of claim 40, wherein the organic chelant contains a —$SO_3$ or —$OSO_3$ group.

42. The method of claim 41, wherein the organic chelant is 1-hydroxybenzene-2-sulfonic acid or a salt thereof.

43. The method of claim 38, wherein the organic chelant contains a —$PO_3$ or —$OPO_3$ group.

44. The method of claim 40, wherein the organic chelant is 4-nitro-1,2-dihydroxy benzene or a salt thereof.

45. The method of claim 2, wherein the organic chelant is a diketone having the structural formula:

$$R^{12}C(O)(C_nH_{2n}Y_w)_x(R^6)_yY_w(C_nH_{2n})_zC(O)R^{13}$$

or derivative thereof
wherein $R^{12}$ and $R^{13}$ are independently —H or a $C_1$–$C_{30}$ alkyl or aralkyl group optionally substituted with a —COOH or —$PO(OH)R^{20}$ or a salt or ester thereof, —$N(R^2)R^3$, —SE or —OE group; $R^6$ is $C_nH_{2n}$ or a derivative thereof; Y is —O, —S, —P or —N; n is 1 to 30, w is 0 or 1, and x, y and z are independently 0 to 5.

46. The method of claim 45, wherein the organic chelant is pentane-2,4-dione or octadecane-2,4-dione.

47. The method of claim 4, wherein the organic chelant is 2,3-butanedionedioxime.

48. The method of claim 1, further comprising mixing the brine with an oxidizer.

49. The method of claim 48, wherein the oxidizer is a slow reacting oxidizer.

50. The method of claim 1, further comprising adding to the brine an absorbent or defoamer.

51. The method of claim 50, wherein the absorbent is activated carbon.

52. The method of claim 48, further comprising adding to the brine an absorbent or defoamer.

* * * * *

UNITED STATES PATENT AND TRADEMARK OFFICE
CERTIFICATE OF CORRECTION

PATENT NO.         : 7,144,512 B2
APPLICATION NO.    : 10/623044
DATED              : December 5, 2006
INVENTOR(S)        : Qu et al.

It is certified that error appears in the above-identified patent and that said Letters Patent is hereby corrected as shown below:

Column 11, lines 7-8, claim 14 replace "$-(CH^2)_xPO(OH)R^{20}$" with "$-(CH_2)_xPO(OH)R^{20}$"

Column 11, line 11, claim 14 replace "$-(CH^2)_xPO(OH)R^{20}$" with "$-(CH_2)_xPO(OH)R^{20}$"

Column 11, line 14, claim 14 replace "$-(CH_2CONR^{14}-)_x$" with "$-(CH_2CONR^{14}-)_z$"

Signed and Sealed this

Thirtieth Day of June, 2009

JOHN DOLL
*Acting Director of the United States Patent and Trademark Office*